United States Patent [19]
Delmoro

[11] Patent Number: 5,719,331
[45] Date of Patent: Feb. 17, 1998

[54] BEAD WIDTH ADJUSTING APPARATUS FOR TIRE UNIFORMITY MACHINES

[75] Inventor: Richard L. Delmoro, Tallmadge, Ohio

[73] Assignee: Akron Special Machinery, Inc., Akron, Ohio

[21] Appl. No.: 638,583

[22] Filed: Apr. 29, 1996

[51] Int. Cl.$^6$ ........................................... E01C 23/00
[52] U.S. Cl. ........................................... 73/146
[58] Field of Search ........................... 73/8, 146, 146.2, 73/146.5; 51/106 R, 281 R; 157/14, 16, 20, 21; 364/463, 506, 508

[56] References Cited

U.S. PATENT DOCUMENTS

| | | | |
|---|---|---|---|
| 3,001,334 | 9/1961 | Giusti et al. | 51/3 |
| 3,552,200 | 1/1971 | Hermanns et al. | 73/146 |
| 3,656,343 | 4/1972 | Braden et al. | 73/146 |
| 3,662,597 | 5/1972 | DeGhetto | 73/146 |
| 3,674,067 | 7/1972 | Cooper | 144/288 A |
| 3,698,233 | 10/1972 | Braden et al. | 73/1 B |
| 4,004,693 | 1/1977 | Tsuji et al. | 209/81 R |
| 4,023,407 | 5/1977 | Vanderzee | 73/146 |
| 4,051,733 | 10/1977 | Tomkin | 73/484 |
| 4,380,927 | 4/1983 | Oda et al. | 73/146 |
| 4,491,013 | 1/1985 | Bubik | 73/146 |
| 4,663,889 | 5/1987 | Strand et al. | 51/106 R |
| 4,677,848 | 7/1987 | Flory | 144/288 |
| 4,704,900 | 11/1987 | Beebe | 73/146 |
| 4,852,398 | 8/1989 | Cargould et al. | 73/146 |
| 4,971,128 | 11/1990 | Koga et al. | 73/146 |
| 5,033,003 | 7/1991 | Lees, Sr. | 73/146 |

FOREIGN PATENT DOCUMENTS

| | | |
|---|---|---|
| 1264045 | 3/1968 | Germany . |
| 1283501 | 11/1968 | Germany . |
| 2424668 | 4/1975 | Germany . |
| 880745 | 10/1961 | United Kingdom . |

*Primary Examiner*—Elizabeth L. Dougherty
*Assistant Examiner*—William L. Oen
*Attorney, Agent, or Firm*—Reese Taylor

[57] ABSTRACT

A tire uniformity machine includes a chucking apparatus (8) that accommodates tires (13) of varying bead width spacings. The chucking apparatus (8) includes a lower chuck assembly (10) positioned below a upper chuck assembly (12). The lower chuck assembly (10) includes an inner spindle apparatus (20) that is rotatably received within an outer spindle apparatus (22). The inner (20) and outer (22) spindle apparatus are carried by the piston rods (38 and 54) of a dual piston cylinder (52). An elongate nose cone (26) of the inner spindle apparatus (20) is carried by the inner piston rod (38), while the outer spindle apparatus (22) is carried by the outer piston rod (54). The dual piston cylinder (52) is operable to independently raise and lower the inner (38) and outer (54) piston rods. The operation of the dual piston cylinder (52) is controlled by a low pressure valve (110), a high pressure valve (112) and a servo valve (114). These valves are, in turn, controlled by a programmable logic controller (104) that follows a sequencing program and instructions from and electric control unit (100). During operation, a position sensor (120) constantly obtains the position of the chucking apparatus (8) and directs this information to the programmable logic controller (104). The programmable logic controller (104) accepts the position information and directs the dual piston cylinder (52) to locate the chucking apparatus (8) at a given position depending on the bead width spacings of the tire (13) to be tested.

17 Claims, 7 Drawing Sheets

BEAD WIDTH ADJUSTING APPARATUS FOR TIRE UNIFORMITY MACHINES

RELATED PATENT APPLICATIONS

None.

BACKGROUND OF THE INVENTION

This invention relates to tire testing and tire uniformity machines used to conduct such testing in particular and more specifically relates to an apparatus and method for quickly and accurately chucking a tire in such a machine prior to testing in order to accommodate tires of differing bead width spacing.

DESCRIPTION OF THE PRIOR ART

While the present invention is not necessarily limited to tire uniformity machines, it does have particular applicability to such machines. Such tire uniformity machines commonly include an upper rim and a lower rim disposed in opposed relationship with the lower rim being movable toward and away from the upper rim.

The lower rim is initially disposed at the level of a conveyor and receives each tire to be tested from the conveyor with the bead seated on the rim, following which the rim and tire are elevated and the opposite bead of the tire engages the upper rim. To that end, the lower rim generally carries a centering cone engagable with a central recess in the upper rim so as to accurately position the rims relatively of each other.

Once the tire has been so positioned and inflated, the upper rim is rotated at a predetermined speed and a load wheel is moved into and out of engagement with the tire tread so as to load the tire, simulating actual operating conditions. A number of sensing and testing apparatus are usually associated with these machines in order to measure various characteristics of the tire under such simulated operational conditions.

Precision is, of course, of paramount importance in any testing procedure, and proper seating of the tire is, therefore, critical to the accurate testing in this procedure. Moreover, the problem of attaining this precision is compounded in the usual tire manufacturing facility because tires are presented to the testing machine conveyor on a more or less continuous basis and having test requirements at a variety of different bead width spacings, often from one tire to the next. Inasmuch as it is desirable to provide means for accommodating these different bead width spacings, it becomes necessary to somehow adjust the gap between the upper and lower rims.

The most basic method of changing bead width spacings is to manufacture rims having a specific fixed bead width spacing. The rims are then changed to accommodate different bead width spacings. Another practice common to the prior art has been to adjust the bead width by removing the cones from the socket in the lower rim assembly and replacing them with ones of different lengths. In that fashion, of course, the spacing between the upper and lower rims, when the unit is closed, can be adjusted. Obviously, however, both methods are time consuming and not really practical in a production scenario where the operation is intended to be substantially continuous and down time is to be avoided.

Another prior art solution to this problem is to provide for raising the lower rim until the space between the upper and lower rims is less than the required bead width spacing, inflating the tire and then lowering the lower rim to the required bead width spacing. This is accomplished by a series of sensors and control devices which will sense the width of the tire and adjust to the desired rim spacing. The difficulty with this approach is primarily a lack of speed and, in a production setting, it is desirable to be able to make the adjustment quickly so as to not interfere with the production line operation.

SUMMARY OF THE INVENTION

It accordingly becomes a principal object of this invention to provide a method and apparatus for accurately positioning a tire in a tire uniformity machine to easily and quickly accommodate differing bead width spacings without any significant interruption in the processing cycle.

To that end, it has been found that a method can be provided for establishing the final desired spacing between the lower rim and the upper rim for a given tire bead width spacing; positioning the tire on the lower rim of the machine chuck and elevating the lower rim to the final predetermined spaced position.

In furtherance of the principal object of the invention, apparatus has been devised which provides an upper rim and a lower rim, movable toward and away from the upper rim, and control means connected to the lower rim apparatus for first sensing the bead width spacing of each tire as it is presented and then controlling the degree of movement of the lower rim apparatus toward the upper rim in accordance with a predetermined agenda.

In furtherance of the aforesaid principal object of the invention, it has also been found that such movement can be facilitated by providing inner and outer concentric spindles with the inner spindle extending toward the upper rim and carrying a nose cone for engagement with a recess in the upper rim. The inner spindle is journalled within the outer spindle for rotation relatively thereof and moves ahead of the outer spindle into engagement with the upper rim.

It has also been found that the chucking operation may be further enhanced by providing cushioning means on the inner spindle to avoid excessive forces upon disengagement of the cone from the upper rim.

Accordingly, production of an improved apparatus for adjusting the bead width spacing of the chuck of a tire uniformity machine of the character above described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
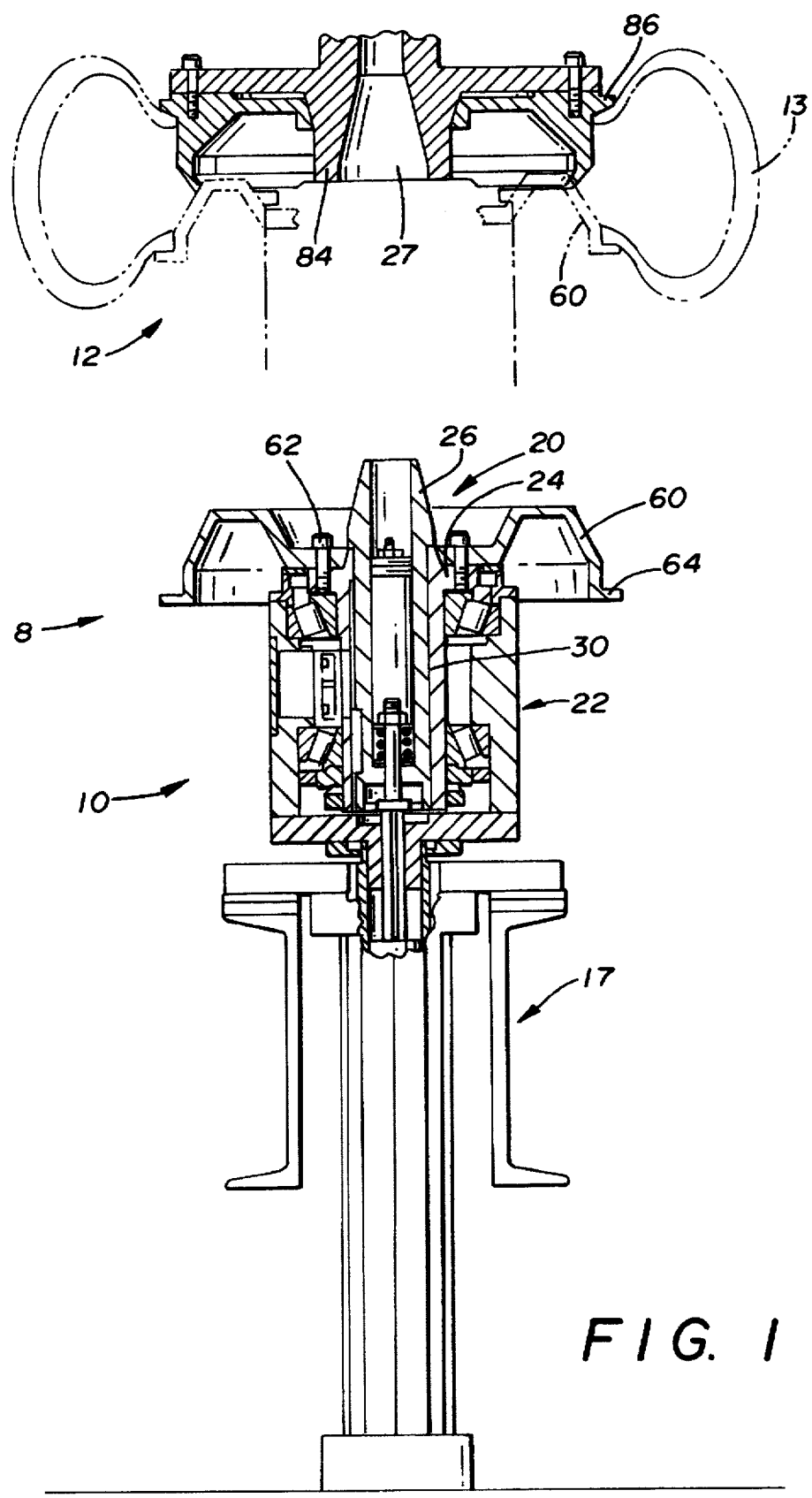
FIG. 1 is an elevational view of the improved bead width adjusting apparatus.
Figure 2:
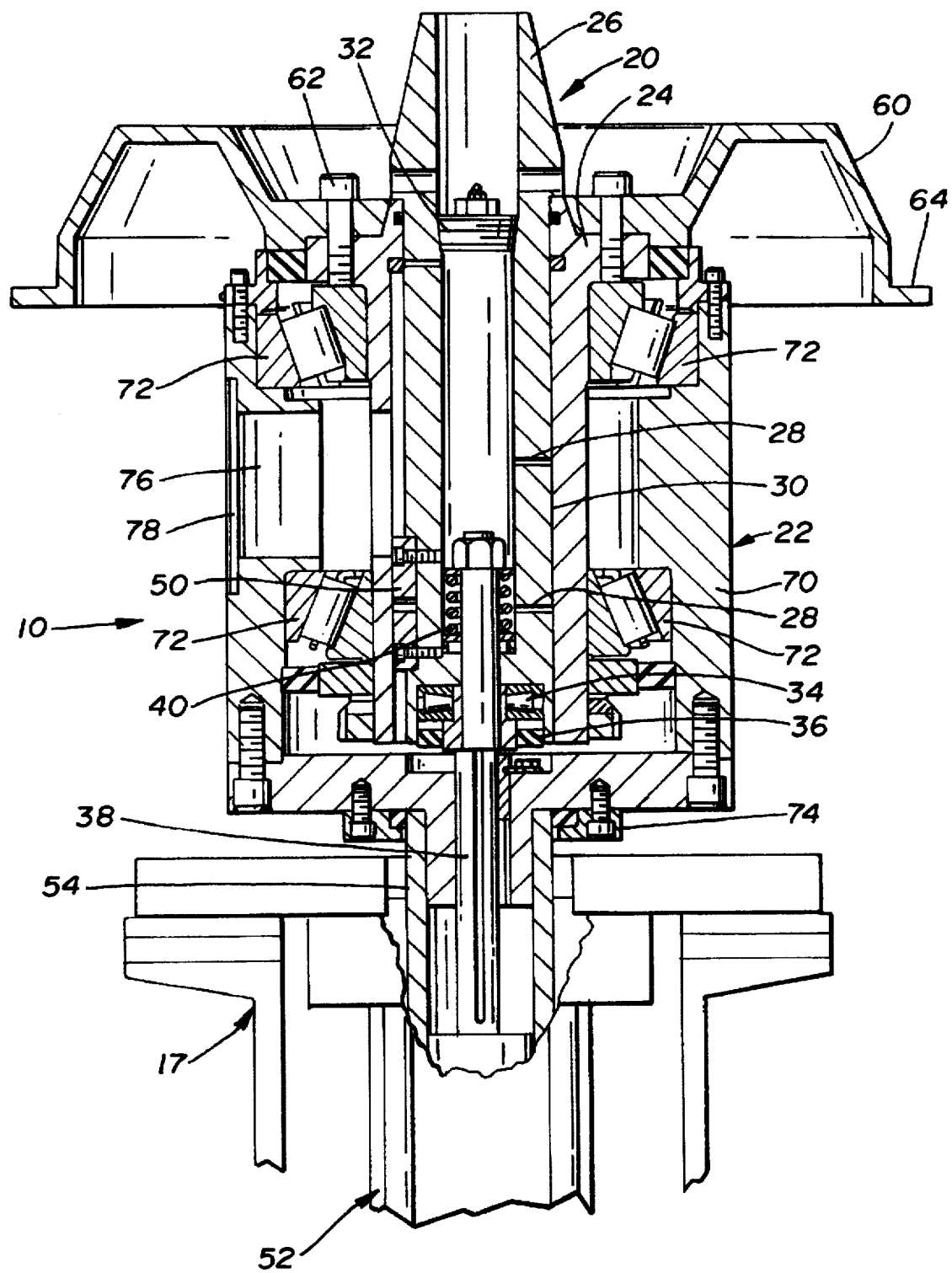
FIG. 2 is an elevational sectional view of the improved apparatus with the inner spindle is retracted.

Referring to FIGS. 1 and 2 of the drawings, it may be seen that the improved chucking apparatus 8 includes a lower chuck assembly 10 and an upper chuck assembly 12. The chucking apparatus 8 receives a tire 13 from a conveyor 14 (shown in FIG. 6) and transports the tire 13 to the test position 15 shown in dashed lines in FIG. 1. When the tire 13 is in the test position, a loadwheel 16, shown in FIG. 6, moves into contact with the tire 13 to simulate tire operating conditions. The upper chuck assembly 12 drives the tire 13, and various sensors and measuring devices record desired information. During the test, the tire 13 is supported between the lower chuck assembly 10 and the upper chuck assembly 12 in a manner that will be subsequently described.

The lower chuck assembly 10 is mounted on the body 17 of the tire uniformity machine 18 (depicted in FIG. 6) and includes an inner spindle apparatus 20 and an outer spindle apparatus 22. The inner spindle apparatus 20 includes a main body 24 which receives an elongate hollow nose cone 26 which projects upwardly therefrom and is configured to mate with a recess 27 in the upper chuck assembly 12 upon elevation of the lower chuck assembly 10, as will be subsequently described. As can be seen FIG. 2, the nose cone 26 projects beyond the top end of the main body 24 of the lower chuck assembly 10 even when the nose cone 26 is fully retracted.

The main body 24 of inner spindle apparatus 20 is elongate and has a through opening 30 in its center for reception of the nose cone 26. The nose cone 26 includes a plurality of lubricating bores 28 extending radially inwardly toward its hollow center. The top of the hollow interior of the nose cone 26 is sealed by a grease filling 32. A lubricant, such as grease, may reside in the hollow interior of the nose cone 26 to provide continuous lubrication through the lubricating bores 28 between the nose cone 26 and the main body 24. Lubrication between the two is desirable because the nose cone 26 translates with respect to the main body 24 each time a tire 13 is tested.

The bottom end of the nose cone 26 is recessed for reception of a thrust bearing 34 and a seal 36. The inner piston rod 38 is received interiorly of the nose cone 26. The inner piston rod 38 carries a spring 40 that cushions the forces of the disengagement between the nose cone 26 and the upper chuck assembly 12 when the lower chuck assembly 10 is lowered from the test position 15.

Figure 3:
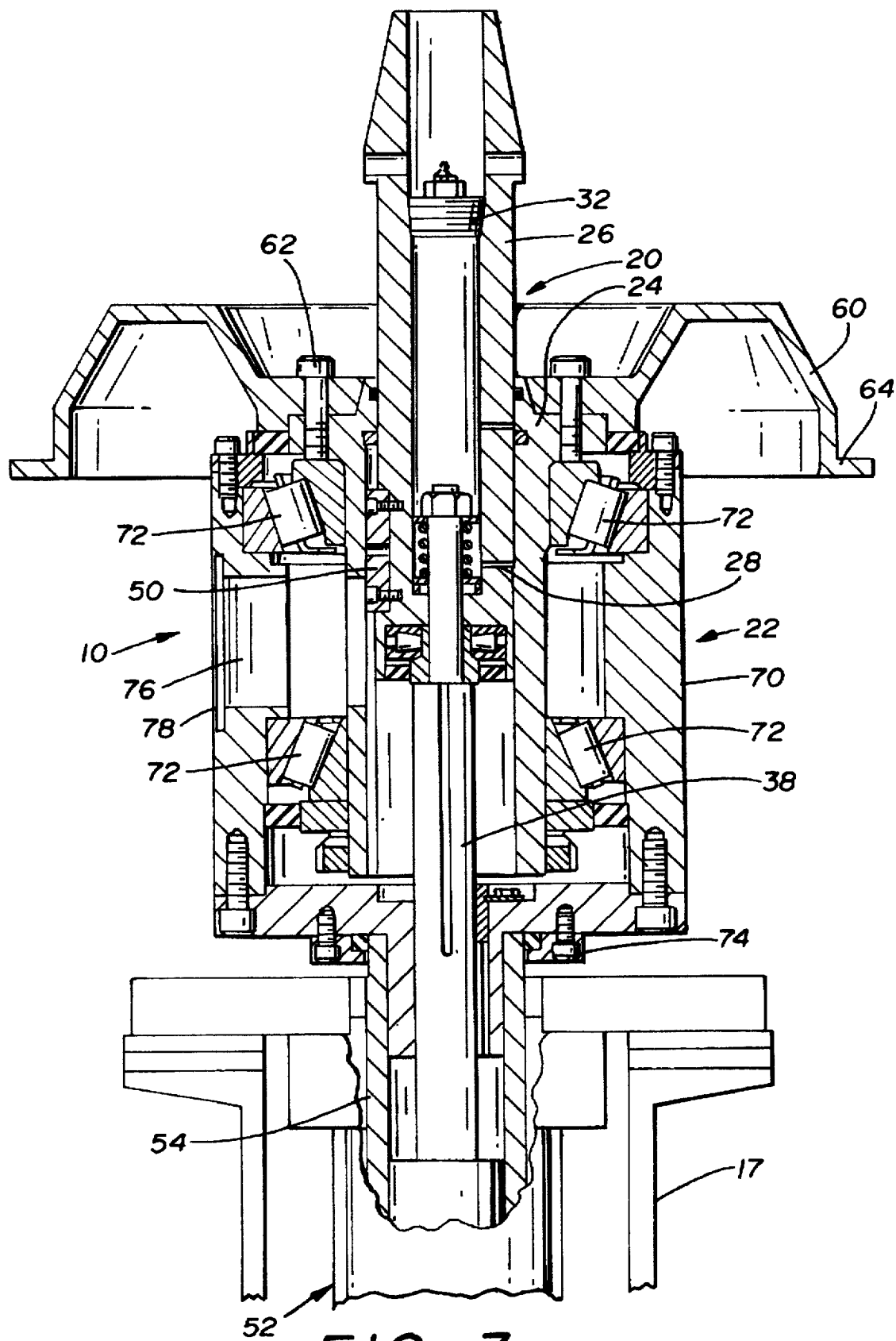
FIG. 3 is an elevational sectional view of the improved apparatus with the inner spindle extended.

The nose cone 26 is mounted on an inner piston rod 38 that extends from a dual piston cylinder 52. The dual piston cylinder 52 is operable to selectively extend and retract the inner piston rod 38 and an outer piston rod 54. Both the main body 24 of the inner spindle apparatus 20 and the outer spindle apparatus 22 are carried by the outer piston rod 54. This arrangement enables the nose cone 26 to be elevated separate from the main body 24 and the outer spindle apparatus 22 as may be seen in FIG. 3.

A lower rim 60 is connected to the upper end of the main body 24 by connectors such as a plurality of bolts 62. In other embodiments of the present invention, connectors other than bolts may be employed. For instance, the lower rim 60 may even be integrally formed with the main body 24. The lower rim 60 includes a lip 64 that is configured to engage and retain a tire 13 as the lower rim 60 is moved upwardly through the tire 13. As may be seen in dashed lines on FIG. 1, the lower rim 60 cooperates with the upper chuck assembly 12 to securely retain the tire 13 during the test.

The outer spindle apparatus 22 includes a main body portion 70 that surrounds inner spindle apparatus 20. The main body portion 70 also is configured to support a plurality of bearings 72. The bearings 72 permit the inner spindle apparatus 20 to rotate relatively of the outer spindle apparatus 22 during the testing operation. A lock ring 74 secures the main body portion 70 to the outer piston rod 54.

The outer spindle apparatus 22 has an access opening 76 in its sidewall which is covered by a removable access opening plate 78. The opening 76 allows access to the interior of the body 70 for easy removal of the drive key 50 in the event that removal of the nose cone 26 becomes necessary. The drive key 50 is disposed between the elongate nose cone 26 and the main body 24 to prevent the elongate nose cone 26 and the main body 24 from rotating independently.

Figure 5:
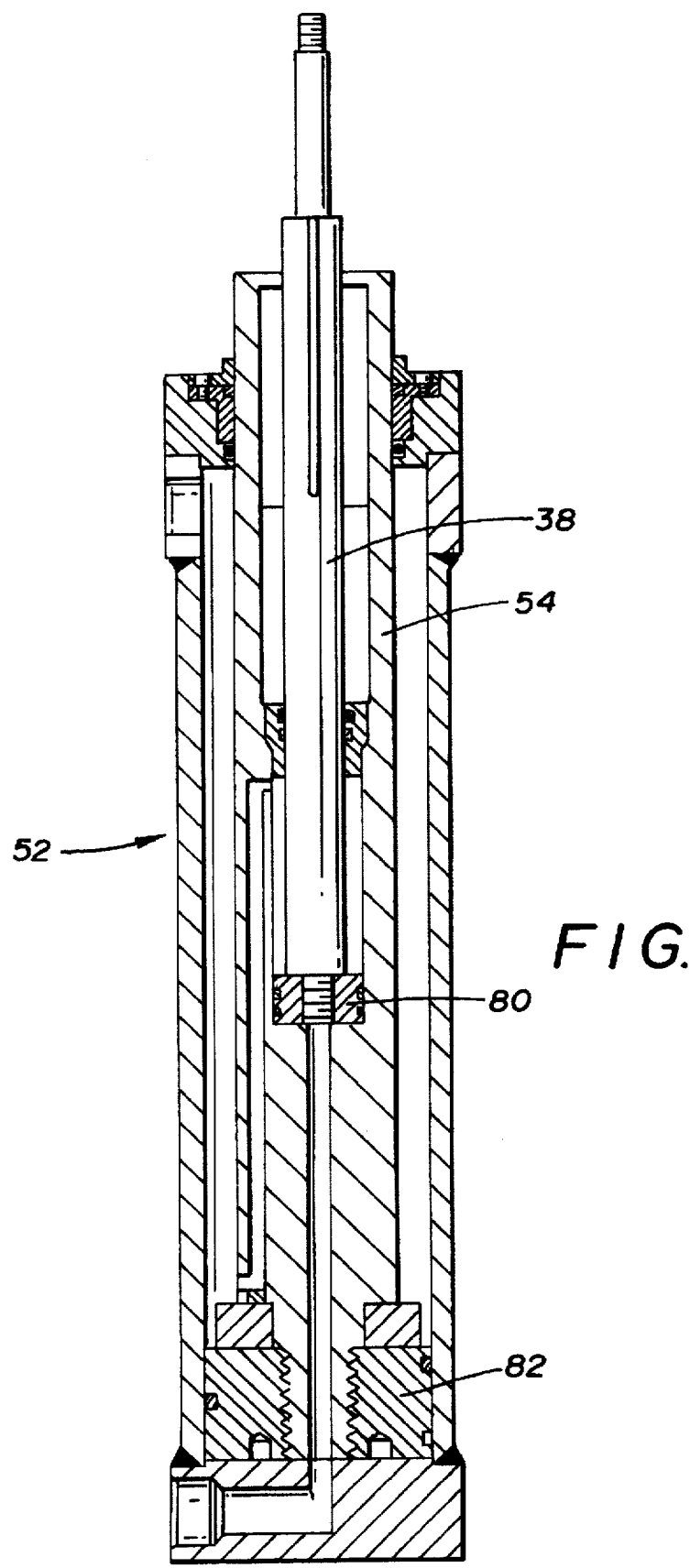
FIG. 5 is a sectional view of a dual piston cylinder used in conjunction with the present invention.

The dual piston cylinder 52 may be seen in FIG. 5. As previously described, the dual piston cylinder 52 includes an inner piston rod 38 and an outer piston rod 54. The movement of the inner piston rod 38 is controlled by varying the fluid pressures in the chambers above and below an inner piston 80. Similarly, the movement of the outer piston rod 54 is controlled by varying the fluid pressures in the chambers above and below an outer piston 82.

The upper chuck assembly 12 includes a body section 84 having an upper rim 86 configured to receive the top half of a tire 13. A supply of air 88 is also typically mounted on the body 17 of the tire uniformity machine 18. Suitable devices for inflating the tires 13 are in communication with the supply of air 88 and may extend through the upper chuck assembly 12. A device to impart rotation to the tire 13 such as a motor 90 may also be mounted on the body 17 and be connected by suitable connectors, such as a belt and pulleys, to the upper chuck assembly 12.

Figure 6:
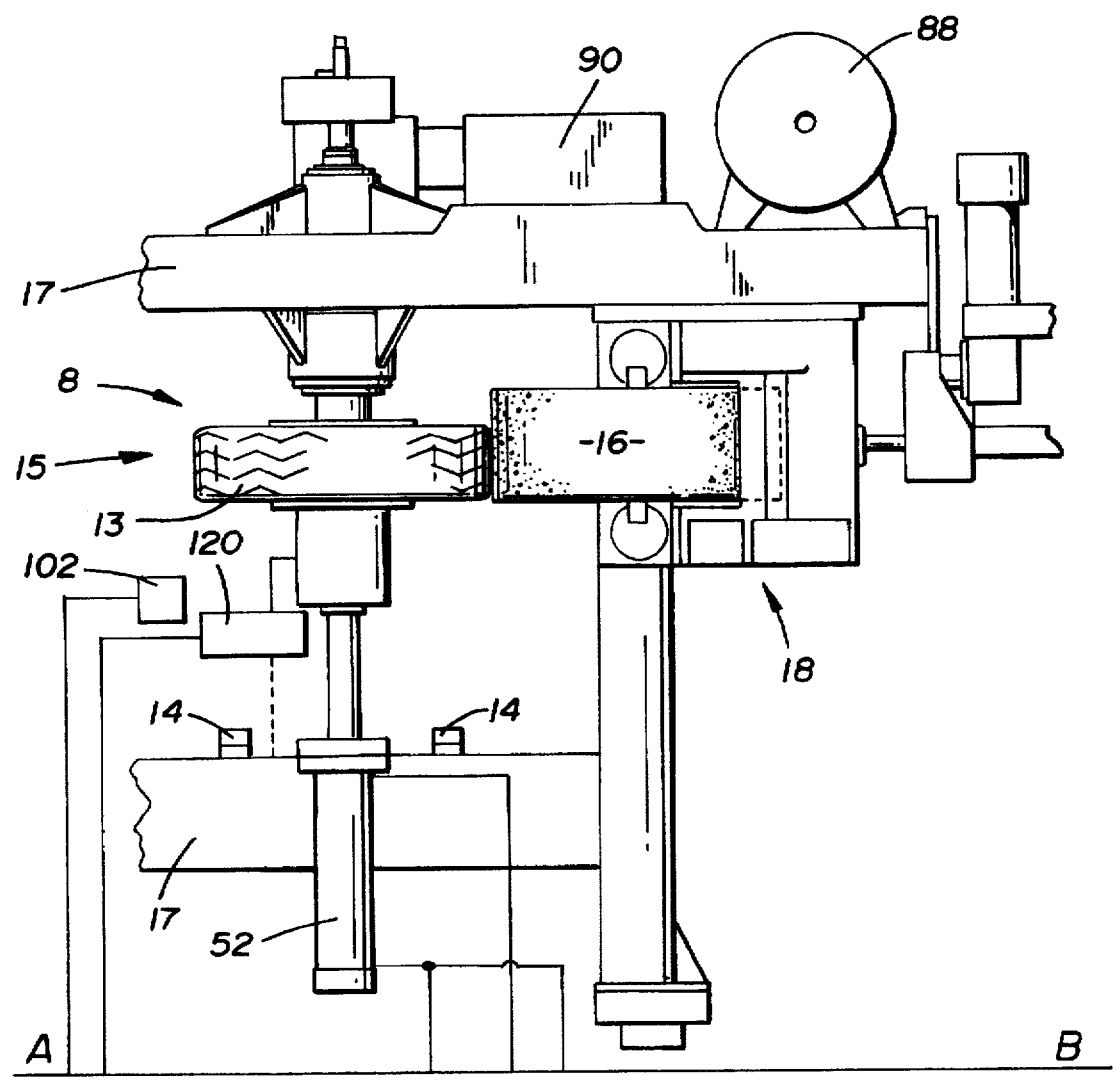
FIG. 6 is a schematic representation of the improved apparatus and the control devices employed to operate the apparatus.
Figure 6A:
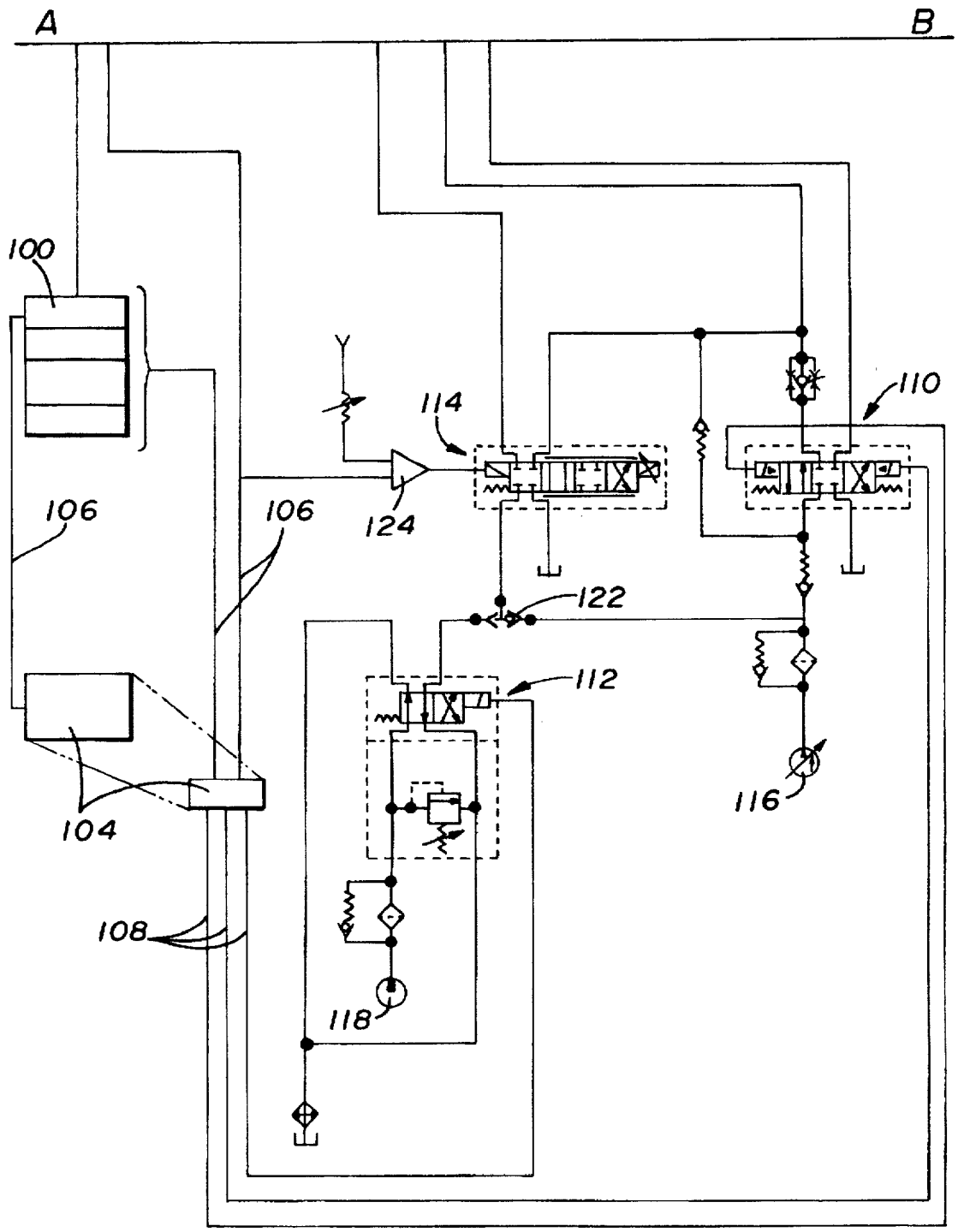
FIG. 6A is a continuation of the schematic representation of the control devices of FIG. 6.

The movement of the dual piston cylinder 52 and thus the movement of the chucking apparatus 8 is controlled by the components depicted in FIGS. 6 and 6A. The components include an electric control unit (ECU) 100 that may be in the form of a programmable computer. The ECU 100 contains the necessary hardware, software, and memory to direct and control the sequence of operations of the tire uniformity machine 18. The ECU 100 communicates with an input source 102 that obtains the set position for the tire 13 to be tested. The set position is the position that the lower rim 60 must be in for securely retaining a tire 13 having a given bead width spacing during the test. The input source 102 may be a device such as a bar code reader, a plurality of manual thumb wheel switches, or a signal from a host computer. The nature of the input source 102 depends on the method of encoding tires 13 and the design of the tire conveyor system.

A programmable logic controller (PLC) 104 is in communication with the ECU 100 and contains the necessary hardware, software, and memory to direct and control the sequence of operations for the tire chucking machine 18. The PLC 104 follows a sequencing program that recognizes various input signals 106 and causes the PLC 104 to send various output signals 108 to various components.

A low pressure valve 110, a high pressure valve 112, and a servo valve 114 are all controlled by the output signals 108 from the PLC 104. The low pressure valve 110 controls the supply of oil to the chambers of the dual piston cylinder 52 from a high volume/low pressure pump 116. Similarly, the high pressure valve 112 controls the supply of oil from a low volume/high pressure pump 118 to the servo valve 114. The servo valve 114 controls the position of the dual piston cylinder 52 by moving oil to the chambers of the dual piston cylinder 52 as directed by a position sensor 120 and the PLC 104. A shuttle valve 122 controls the source of oil supplied to the servo valve 114.

The position sensor 120 recognizes the position of the chucking assembly during its operation. The nature of the position sensor 120 may be one of the numerous sensors that are known in the art. For instance, the position sensor 120 may be ultrasonic-based, laser-based, a linear variable differential transformer, or a direct current displacement transducer. The position sensor 120 creates a signal that is delivered to the PLC 104 and an amplifier 124. The amplifier 124 amplifies the signal and delivers it directly to the servo valve 114.

In use or operation of the improved bead width adjusting apparatus, the input source 102 senses the bead width spacing of the next tire 13 to be inspected and sends that information to the ECU 100. That tire 13 is then delivered to the tire chucking apparatus 8 and positioned by the conveyor 14 to be received on the lower rim 60 of the lower chuck apparatus 10. The bead width spacing obtained by the input source 102 is converted into a set position for the dual piston cylinder 52.

Once the ECU 100 receives the signal that the tire 13 is properly positioned, the ECU 100 directs the PLC 104 to begin the sequencing program. As such, the PLC 104 sends an output signal that energizes the low pressure valve 110 thus supplying high volume/low pressure oil to the chamber below the pistons 80 and 82 of the dual piston cylinder 52. The oil causes the inner piston rod 38 and thus the nose cone 26 to immediately extend approximately 4½ inches. At the same time, the outer piston rod 54 begins to extend causing the tire 13 to be received on the lower rim 60. As the piston rods 38 and 54 are extending, the position sensor 120 tracks the movement of the assembly and feeds that information back to the PLC 104 and the amplifier 124.

The lower chuck assembly 10 continues to rise until the nose cone 26 is firmly seated in the recess 27 of the upper chuck assembly 12. At this time, oil continues to be directed into the dual piston cylinder 52 until approximately 1 ton of force or more is created between the nose cone 26 and the upper chuck assembly 12. When the nose cone 26 is firmly seated, the lower rim 60 has reached a programmed tire inflation position. The tire inflation position is controlled by the PLC 104 and is intended to position the tire 13 in the correct position to be inflated.

When the lower rim 60 approaches the tire inflation position, the PLC 104 de-energizes the low pressure valve 110, energizes the high pressure valve 112 causing the shuttle valve 122 to shift allowing high pressure oil to reach the servo valve 114 and directs the servo valve 114 to control the final positioning of the lower rim 60. The tire 13 is then being inflated through an orifice in the upper chuck assembly 12. As the tire 13 is being inflated, the control system moves the lower rim 60 up or down to the set position as initially read by the input source 102. The position of the lower rim 60 is controlled by the servo valve 114 which directs oil to the various chambers of the dual piston cylinder 52. The high pressure oil allows the servo valve 114 to withstand the inflation and test forces and maintain a balanced position.

Figure 4:
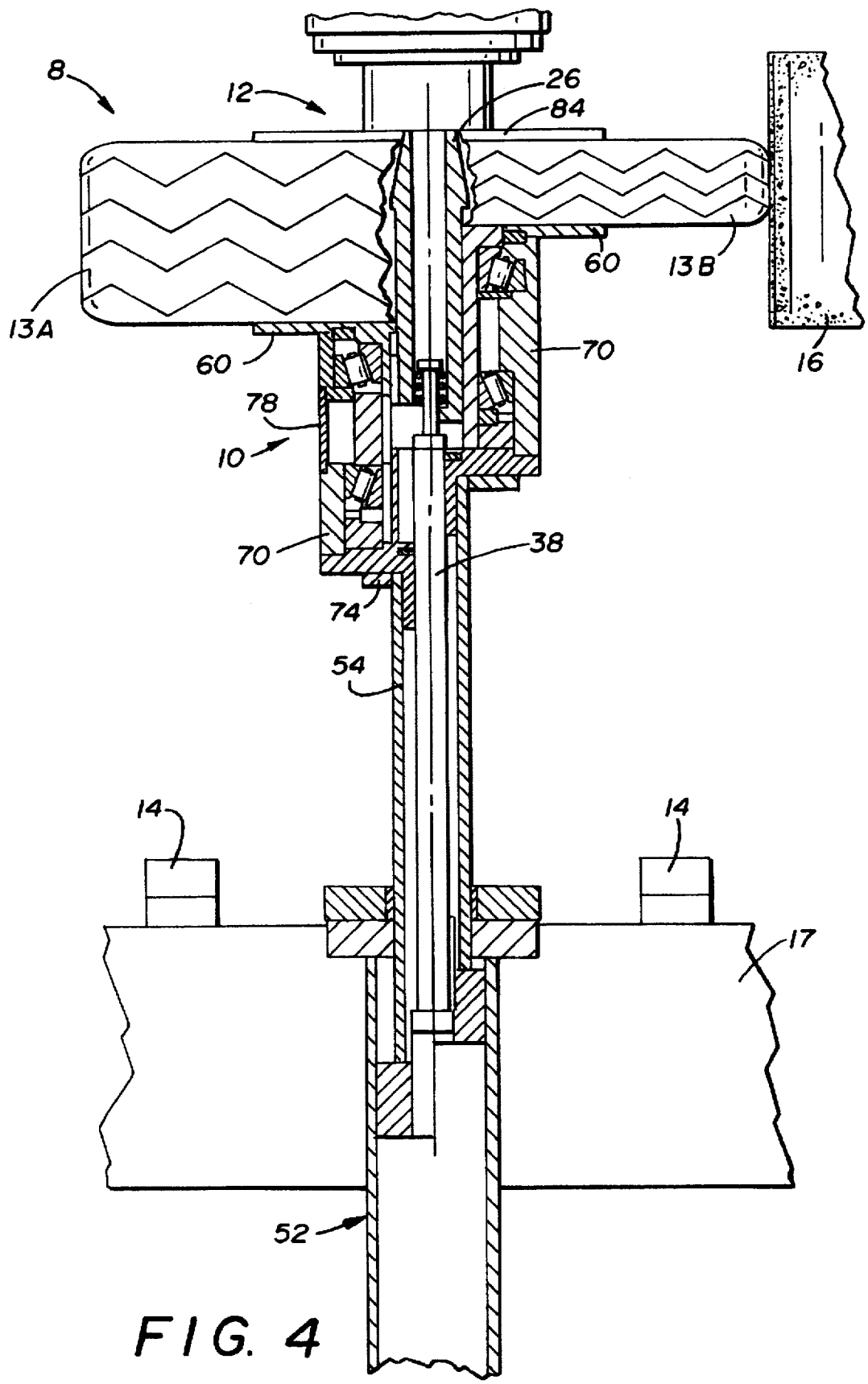
FIG. 4 is a split elevational view of the improved bead width adjusting apparatus in the closed or chucked position on two tires having different bead widths.

With this apparatus and method, the precise location of the lower rim 60 may be controlled for tires 13 having different bead width spacings. As may be seen in FIG. 4, the tire 13A on the left half of the drawing has a larger bead width than the tire 13B on the right half of the drawing. The control system has, however, recognized this difference and positioned the lower rim 60 accordingly. In both halves, the inner piston rod 38 has been extended causing the nose cone 26 to engage the upper chuck assembly 12. In the situation with the wide bead width, the control system has directed the outer piston rod 54 to stop at a lower set position than in the situation depicted on the right with the smaller bead width. In both cases, the tire 13 is correctly positioned adjacent the loadwheel 16 and both tires 13A and 13B are securely held by the chucking apparatus 8. Also, in both cases, the lower rim 60 is moved into the set position continuously and directly—that is, without any intervening stops. The direct movement increases the speed of the machine, while the independent position of the lower rim 60 allows the machine to be used with a wide variety of tires.

The ECU 100 then causes the loadwheel 16 to be advanced and the test begins. When the test is complete, the tire 13 is deflated and the PLC 104 receives a test complete signal from the ECU 100. At this time, the PLC 104 directs the low pressure valve 110 to supply the high volume/low pressure oil to the chamber above the pistons 80 and 82 in the dual piston cylinder 52. As this occurs, the lower chuck assembly 10 rapidly lowers back toward the conveyor 14. Once completely retracted, the tested tire 13 is deposited back on the conveyor 14 and the process begins again.

While a full and complete description of the invention is set forth in accordance with the dictates of the patent statutes, it should be understood that modifications can be resorted to without departing from the spirit hereof or the scope of the appended claims.

What is claimed is:

1. A method of accurately positioning a tire in a tire uniformity machine, comprising the steps of:

establishing a set position from the bead width spacing of a given tire;

positioning the given tire on the lower rim of the chucking apparatus;

elevating the lower rim directly to the set position determined for the given tire;

elevating an inner member of the lower rim to engage a portion of the upper rim;

elevating the lower rim to a tire inflation position;

inflating the tire; and positioning the lower rim in accordance with the established spacing for the tire to the set position while the tire is being inflated.

2. A method according to claim 1, wherein the step of elevating an inner member further comprises the steps of:

extending an inner piston rod causing the inner member to elevate approximately 4½ inches with respect to the lower rim;

elevating both the inner member and the lower rim until the inner member is received by the upper rim; and creating force between the inner member and the upper rim.

3. A chucking apparatus for accurately positioning a tire in the chuck of a tire uniformity machine, said chucking apparatus comprising:

an upper rim apparatus;

means for imparting rotational movement to said upper rim apparatus;

tire inflation means attached to said upper rim apparatus for inflating a tire received on said upper rim apparatus;

a lower rim apparatus movable toward and away from said upper rim apparatus;

sensing means for sensing the bead width of the given tire establishing the degree of movement of said lower rim apparatus; and control means in communication with said lower rim apparatus for controlling the movement in response to said sensing means of said lower rim apparatus toward and away from said upper rim;

said lower rim apparatus comprising:

inner and outer concentric spindle apparatus;

said inner spindle apparatus extending toward said upper rim;

said inner spindle apparatus comprising an elongate nose cone slidably received in a main body; and said inner spindle apparatus being journalled within said outer spindle apparatus for rotation relatively thereof.

4. A chucking apparatus according to claim 3, wherein said lower rim apparatus further comprises a dual piston cylinder, said dual piston cylinder having an inner piston rod operatively connected to said nose cone, said outer piston rod attached to said outer spindle apparatus.

5. A chucking apparatus according to claim 4, wherein said control means controls the movement of said dual piston cylinder thereby controlling the location of the lower rim apparatus with respect to the upper rim apparatus.

6. A chucking apparatus according to claim 4, wherein said control means comprises:

an ECU;

a PLC in communication with said ECU;

an input source in communication with said ECU;

a position sensor in communication with said PLC;

said position sensor configured to recognize the position of said lower rim;

a high volume/low pressure oil pump;

a low pressure valve in communication with said PLC for controlling the flow of oil from said high volume/low pressure oil pump to said dual piston cylinder;

a servo valve in communication with said position sensor;

a low volume/high pressure oil pump;

a high pressure valve in communication with said PLC for controlling the flow of oil from said low volume/high pressure oil pump to said servo valve;

said servo valve being in communication with said dual piston cylinder; and a shuttle valve disposed between said high pressure valve and said servo valve.

7. A chucking apparatus according to claim 3, wherein said elongate nose cone is independently movable from said outer spindle apparatus.

8. A chucking apparatus that accurately positions a tire in a tire uniformity machine, the chucking apparatus including an upper chuck assembly adapted to receive a portion of a lower chuck assembly, said lower chuck assembly comprising:

an outer spindle apparatus;

an inner spindle apparatus rotatably received by said outer spindle apparatus;

said inner spindle apparatus comprising an elongate nose cone slidably received in a main body;

a dual piston cylinder having an inner piston rod and an outer piston rod;

said outer piston rod attached to said outer spindle apparatus;

said inner piston rod operatively attached to said elongate nose cone; and sensing and control means operatively associated with said cylinder for predetermining the desired range of movement; of said outer piston rod in response to the bead width of the tire and controlling the movement of said outer spindle apparatus in accordance therewith.

9. A chucking apparatus according to claim 8, further comprising a lower rim configured to receive a tire thereon, said lower rim attached to said main body of said inner spindle apparatus.

10. A chucking apparatus according to claim 8, further comprising a spring operatively connected between said elongate nose cone and said inner piston rod.

11. A chucking apparatus according to claim 8, wherein said elongate nose cone has a cavity therein, said cavity having a lubricant disposed therein.

12. A chucking apparatus according to claim 11, wherein said elongate nose cone has a plurality of lubricating bores, each of said lubricating bores extending from said cavity through said elongate nose cone.

13. A chucking apparatus according to claim 8, further comprising a plurality of bearings disposed between said outer spindle apparatus and said main body of said inner spindle apparatus.

14. A chucking apparatus according to claim 8, further comprising a thrust bearing disposed between said elongate nose cone and said inner piston rod.

15. A chucking apparatus according to claim 8, further comprising a drive key disposed between said elongate nose cone and said main body, said drive key preventing said elongate nose cone and said main body from rotating independently.

16. A chucking apparatus according to claim 15, wherein said outer spindle apparatus has an access opening which permits access to said drive key, said access opening being covered by a removable access opening plate.

17. A chucking apparatus according to claim 8, further comprising a lock ring, said lock ring securing said outer spindle apparatus to said outer piston rod.

* * * * *